US010860571B2

(12) United States Patent
Bensberg et al.

(10) Patent No.: US 10,860,571 B2
(45) Date of Patent: Dec. 8, 2020

(54) STORAGE AND PRUNING FOR FASTER ACCESS OF A DOCUMENT STORE

(71) Applicant: SAP SE, Walldorf (DE)

(72) Inventors: Christian Bensberg, Heidelberg (DE); Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 399 days.

(21) Appl. No.: 15/344,223

(22) Filed: Nov. 4, 2016

(65) Prior Publication Data

US 2018/0129696 A1  May 10, 2018

(51) Int. Cl.
G06F 16/20 (2019.01)
G06F 16/23 (2019.01)
G06F 16/93 (2019.01)

(52) U.S. Cl.
CPC .......... G06F 16/2365 (2019.01); G06F 16/93 (2019.01)

(58) Field of Classification Search
None
See application file for complete search history.

(56) References Cited

U.S. PATENT DOCUMENTS

| 5,649,183 A * | 7/1997 | Berkowitz | G06F 16/328 |
| 7,319,994 B1 * | 1/2008 | Sercinoglu | G06F 17/30619 |
| 2010/0161569 A1 * | 6/2010 | Schreter | G06F 17/30327 |
| | | | 707/696 |
| 2010/0223276 A1 * | 9/2010 | Al-Shameri | G06F 16/2465 |
| | | | 707/769 |
| 2012/0166401 A1 * | 6/2012 | Li | G06F 16/215 |
| | | | 707/692 |
| 2013/0159659 A1 * | 6/2013 | Gelman | G06F 16/278 |
| | | | 711/173 |
| 2014/0032579 A1 * | 1/2014 | Merriman | G06F 17/30345 |
| | | | 707/756 |
| 2014/0280707 A1 * | 9/2014 | Shukla | H04L 67/1006 |
| | | | 709/217 |
| 2015/0032758 A1 * | 1/2015 | Schneider | G06F 17/30336 |
| | | | 707/741 |
| 2015/0095307 A1 * | 4/2015 | Bensberg | G06F 17/30289 |
| | | | 707/714 |
| 2015/0261839 A1 * | 9/2015 | Namburi | G06F 17/30584 |
| | | | 707/610 |

(Continued)

*Primary Examiner* — Jau Shya Meng
(74) *Attorney, Agent, or Firm* — Mintz Levin Cohn Ferris Glovsky and Popeo, P.C.

(57) ABSTRACT

A system for storage, access, and/or pruning of documents of a document store is provided. In some implementations, the system performs operations comprising analyzing a plurality of parameters of a plurality of documents stored among a plurality of slices in a database and generating, based on the analyzing, statistics about the plurality of parameters including a range of document identifiers present in corresponding slices from the plurality of slices. The operations can further comprise pruning, based on the statistics, one or more slices of the plurality of slices, the pruning triggered in response to a query related to at least a portion of the plurality of stored documents. The operations can further comprise responding to the query based on slices that are not pruned. One or more of the operations can be implemented by a database server. Related systems, methods, and articles of manufacture are also described.

17 Claims, 12 Drawing Sheets

(56) References Cited

U.S. PATENT DOCUMENTS

| | | | |
|---|---|---|---|
| 2015/0370825 A1* | 12/2015 | Outcalt | G06F 17/30174 |
| | | | 707/608 |
| 2016/0092541 A1* | 3/2016 | Liu | G06F 16/278 |
| | | | 707/715 |
| 2016/0117410 A1* | 4/2016 | Kamiya | G06F 17/30958 |
| | | | 715/242 |
| 2017/0060856 A1* | 3/2017 | Turtle | G06F 16/93 |

* cited by examiner

320

| Slice 1 | Slice 2 |
|---|---|
| 710 | 720 |
| { 0: 4711<br>3: 2014-04-01<br>... } | { 0: 9055<br>3: 2016-05-01<br>... } |
| { 0: 4712<br>3: 2014-04-01<br>... } | { 0: 9056<br>3: 2016-05-01<br>... } |
| { 0: 4714<br>3: 2014-04-01<br>... } | { 0: 9059<br>3: 2016-05-01<br>... } |

124

730

| | Slice 1 | Slice 2 |
|---|---|---|
| 0 | id | |
| 1 | name | |
| 2 | age | min: 4000<br>max: 8000 · min: 7000<br>max: 11000 |
| 3 | joinDate | min: 2014-01-05<br>max: 2015-04-05 · min: 2015-04-04<br>max: 2016-05-06 |
| 4 | address | |
| 5 | street | |
| 6 | city | |

1210
Analyze a plurality of parameters of a plurality of stored documents stored among a plurality of slices in a database

1220
Generate one or more statistics about the plurality of parameters, the one or more statistics comprising information on a range of document identifiers present in corresponding slices from the plurality of slices

1230
Store the statistics

1240
Receive a query related to at least a portion of the plurality of stored documents

1250
Prune one or more slices of the plurality of slices based on the query

1260
Generate a response based on the remaining plurality of slices

1270
Provide the response to a user device which initiated the query

FIG. 12

STORAGE AND PRUNING FOR FASTER ACCESS OF A DOCUMENT STORE

TECHNICAL FIELD

The subject matter described herein relates to, among other things, database management, and more particularly to systems and methods for storage, access, and/or pruning of documents and/or semi-structured data in a document store.

BACKGROUND

In order to process a query (e.g., database system query), relevant data should be considered. In some implementations, one or more threads can be used to process disjunctive pieces of data. More threads can decrease processing time, but can also create a larger load on the database system. Thus, it may be desirable to reduce the load of the system for a given query.

SUMMARY

In one aspect, a method, computer program product and system are provided. The method, computer program product and system execute operations for storage, access, and/or pruning of data in a document store. In one variation, the operations can include analyzing, at a database server, a plurality of parameters of a plurality of stored documents, wherein the plurality of stored documents are stored among a plurality of slices in a database. The operations can further include generating, by the database server and based on the analyzing, statistics about the plurality of parameters, wherein the statistics comprise a range of document identifiers present in corresponding slices from the plurality of slices. The operations can further include pruning, by the database server and based on the statistics, one or more slices of the plurality of slices, the pruning triggered in response to a query related to at least a portion of the plurality of stored documents. One or more of the operations can occur at or by a database server.

In some variations the operations can further include storing, in a dictionary, the statistics along with corresponding definitions of parameters related to the statistics, wherein pruning the one or more slices includes considering only slices from the plurality of slices which include statistics responsive to the query. In some aspects, the plurality of stored documents are encoded based on the dictionary and the dictionary includes a plurality of definitions corresponding to the plurality of parameters. In related aspects, each of the plurality of definitions can include a reference value and a corresponding parameter from the plurality of parameters, wherein the plurality of stored documents are encoded to include a plurality of reference values defined in the dictionary in place of at least a portion of the plurality of parameters.

In some variations the operations can further include storing, by the database server, the statistics along with a list of indices for the plurality of slices, wherein each index in the list of indices includes a pointer to a corresponding slice, and wherein pruning the one or more slices includes considering only slices from the plurality of slices which include statistics responsive to the query. Additionally or alternatively, the operations can further include storing, by the database server, the statistics as entries in a statistics log of the database, wherein the statistics log is independent of a data log of the database, and wherein pruning the one or more slices includes considering only slices from the plurality of slices which include statistics responsive to the query. In related aspects, the statistics log can be generated based on processing full slices from the plurality of slices, wherein the processing occurs asynchronously from processing the query.

In some implementations, the plurality of slices can comprise an organization of documents and/or the plurality of slices can be part of one or more database partitions. In some aspects, the plurality of parameters can comprise document creation dates. In related implementations, the statistics can further comprise a range of the document creation dates present in the corresponding slices. Other information about the plurality of stored documents can be used in a similar manner.

In some variations, analyzing the plurality of parameters can include determining, for each of the plurality of parameters, a maximum value and a minimum value, and/or generating the statistics cam include calculating, for each of the plurality of parameters, ranges of values based on the corresponding maximum value and minimum value. In some aspects, the plurality of stored documents can be stored in a document storage collection. In various implementations, the plurality of stored documents can binary representations of JavaScript Object Notation (JSON) documents (e.g., PaceJSON documents).

Implementations of the current subject matter can include, but are not limited to, systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 is a functional block diagram of a portion of the slices of documents and the dictionary, in accordance with some embodiments;

FIG. 12 is a flowchart of a method for storage, access, and/or pruning slices of documents in a document store, in accordance with some embodiments.

When practical, similar reference numbers denote similar structures, features, or elements.

DETAILED DESCRIPTION

As noted above, query processing can create a large load for database systems. However, in some aspects, pruning can be used to reduce the scope of relevant data (e.g., reduce the amount of data which the database system considers during query processing). In turn, reducing the scope of the relevant data can require less threads and/or allow the treads to run faster, as less data is required to be processed per thread, yielding a faster response time. In an in-memory database or document store, chunks of data may need to be loaded into memory so that they may be processed. Although some of the relevant chunks of data may already be loaded prior to query-execution time, a query may cause additional chunks to be loaded. With pruning, some of these chunks may be identified as not necessary, and the system can skip loading these chunks (e.g., into memory), thus reducing memory requirements and/or I/O time for loading data for the execution of a query.

File storage and/or processing systems can be centralized through the use of one or more servers, which can offload processing and/or storage from client devices accessing the one or more servers. However, although servers may make it easier and/or more convenient for users to store/access data from virtually anywhere, servers may still only have a limited processing and/or storage capacity (e.g., a server or set of servers may only be able to process so many things at one time without degrading performance). Therefore, owners/operators of servers may wish to optimize processing procedures performed at the servers. Thus, at least some of the subject matter described herein relates to systems and methods for managing, storing, accessing, and/or pruning of data for a document store. As used herein, data may refer to semi-structured data, electronic documents such as JSON/PJSON documents, and/or the like.

Figure 1:
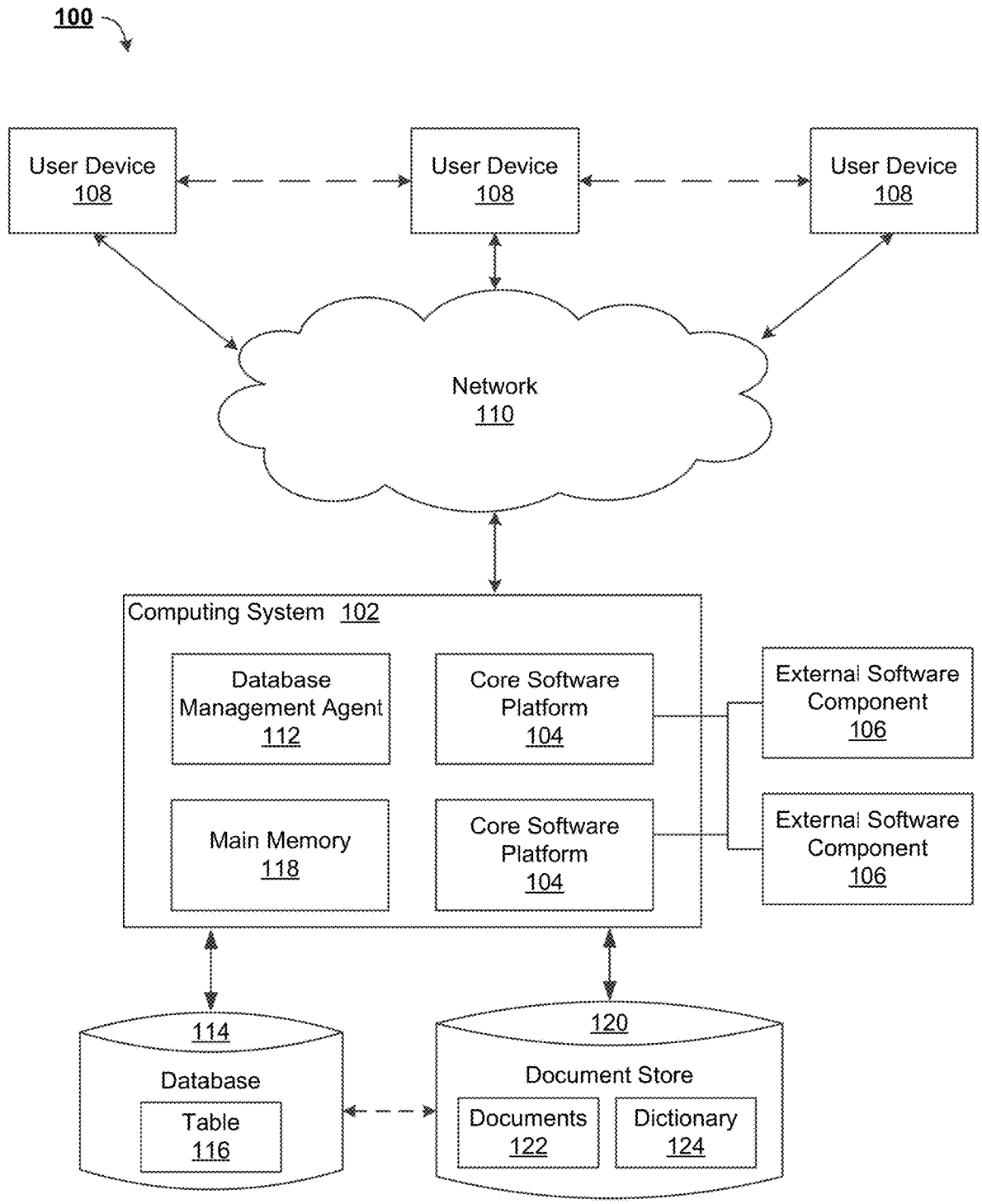
FIG. 1 is a functional block diagram illustrating a system in which features consistent with implementations of the current subject matter may be implemented.

FIG. 1 is a diagram of a system 100 that can implement one or more features consistent with the current subject matter. A computing system 102 can include one or more core software platform modules 104 providing one or more features of a high-level programming software system or other software that includes database management features. The computing system can also aggregate or otherwise provide a gateway via which users can access functionality provided by one or more external software components 106. One or more user devices 108 can access the computing system, either via a direct connection, a local terminal, or over a network 110 (e.g. a local area network, a wide area network, a wireless network, the Internet, or the like). Examples of the user devices 108 include personal computers, desktop computers, laptops, workstations, cell phones, digital media devices, smart phones, smart watches, PDAs (personal digital assistants), tablets, hardware/software servers, and/or the like.

A database management agent 112 or other similar software/hardware can access a database layer, such as database 114, which includes at least one table 116, which can in turn include at least one column. The database table 116 can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like.

Similarly, the database management agent 112 or other similar software/hardware can access a document store 120 (also referred to herein as "document storage") that includes any number of documents 122 and/or dictionaries 124 (including zero). The documents 122 can store documents including JSON (JavaScript Object Notation) documents, PJSON (PaceJSON) documents, other structured/semi-structured data, and/or the like. In some aspects, a PJSON document can be a binary representation of a JSON document. The one or more dictionaries 124 can include reference values used for the encoding and/or decoding of the documents 122, as described herein. In some aspects, encoding and decoding can refer to compression and/or decompression of the documents 122.

The database management agent 112 can implement one or more of the features of implementations discussed herein. For example, the database management agent 112 or other comparable functionality can be configured to load a database table 116, document 122, dictionary, and/or the like into the main memory 118. The database management agent 112 can be configured to load the information from the database 114 and/or document store 120 to the main memory 118 in response to receipt of a query instantiated by a user or computer system through one or more user devices 108, external software components 106, core software platforms 104, or the like. In some embodiments, all (or substantially all) of the operational data of the database 114 and/or the document store 120 can reside in-memory (e.g., in random-access memory (RAM)).

At least a portion of the illustrated system 100 may be implemented as a cloud-based database management system (e.g., not including the user devices 108). In some aspects, a cloud-based database management system may be a hardware and/or software system for receiving, handling, optimizing, and/or executing database 114 or document store 120 queries. In some aspects, the database 114 can be a structured, organized collection of data, such as schemas, tables, queries, reports, views, and/or the like, which may be processed for information. In some aspects, the document store 120 can be a structured or partially structured collection of documents, such as JSON documents, PJSON documents, other structured/semi-structured data, and/or the like, which may be processed for information.

The database 114 and/or document store 120 may be physically stored in a hardware server or across a plurality of hardware servers. As illustrated, in some embodiments, communication may occur between the database 114 and the document store 120. In some aspects, a cloud-based database management system may be a hardware and/or software system that interacts with a database, document store, users, and/or other software applications for defining, creating, and/or updating data, for receiving, handling, optimizing, and/or executing database/document store queries, and/or for running applications which utilize a database/document store. Although the database 114 and document store 120 are illustrated as being separate and, at times, described as being separate, in various embodiments, at least a portion of the database 114 and the documents store 120 can be combined. In some aspects, the document store 120 can be referred to as a database.

In some aspects, documents stored in the memory 118 and/or the document store 120 may be encoded. In various implementations, the memory 118 and/or the document store 120 may contain one or more dictionaries for encoding and/or decoding the documents stored in the memory 118, the document store 120, and/or otherwise communicated via the network 110. For example, during runtime of an application, the database management agent 112 may need to access encoded documents in order to run the application, and may access the document store 120 in order to obtain the relevant document(s). As storage can become constrained at times and/or a larger amount of stored data can decrease processing efficiency, conservation of storage can increase operating efficiencies. As such, systems and methods for doing so are described herein.

In some aspects, a user (e.g., a user of the user device 108) may request a document stored within the memory 118 or the document store 120, and/or provide a document for storage at the memory 118 or the document store 120, which can require communications over the network 110. As network communications can become constrained/limited at times, conservation network resources can provide increased throughput. As such, systems and methods for doing so are described herein. The database 114 may be a column store database. Computing system 102 may be configured to perform OLTP (online transaction processing) and/or OLAP (online analytical processing), which can include complex analytics and tasks.

Figure 2:
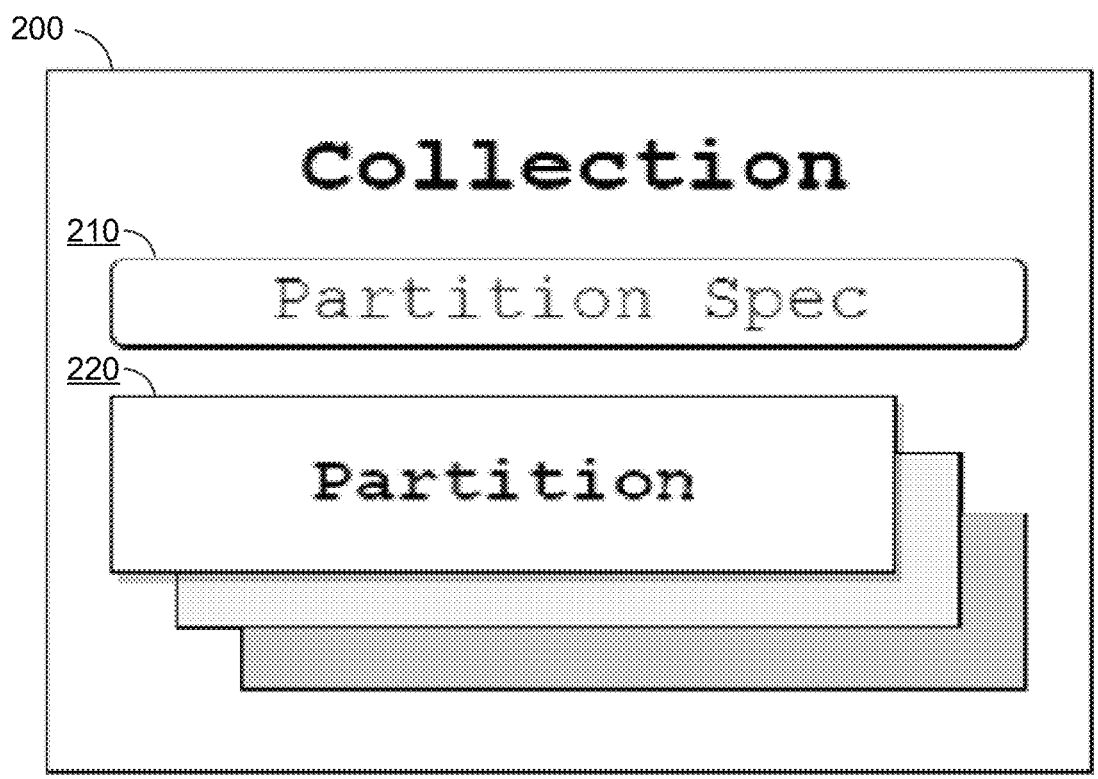
FIG. 2 is a functional block diagram of a collection of documents, which forms a portion of the document store of FIG. 1, in accordance with some embodiments.

FIG. 2 is a functional block diagram of a collection 200 of documents, which forms a portion of the document store 120 of FIG. 1, in accordance with some embodiments. The illustrated collection 200 can be one of a plurality of collections used to store the documents 122 of the document store. As illustrated, the collection 200 can include a partition specification 210 and/or one or more partitions 220. In some aspects, the partitions 220 can be regarded as data fragments in memory, which can be organized on a persistence layer level. In some implementations, the partitions 220 can be divided among a plurality of physical devices and/or can be organized in a manner that speeds up access to more frequently accessed documents. In some aspects, a partition from the plurality of partitions 220 can include hundreds of gigabytes worth of documents. In various embodiments, the partition specification 210 can provide information related to the plurality of partitions 220 which are part of the collection.

Figure 3:
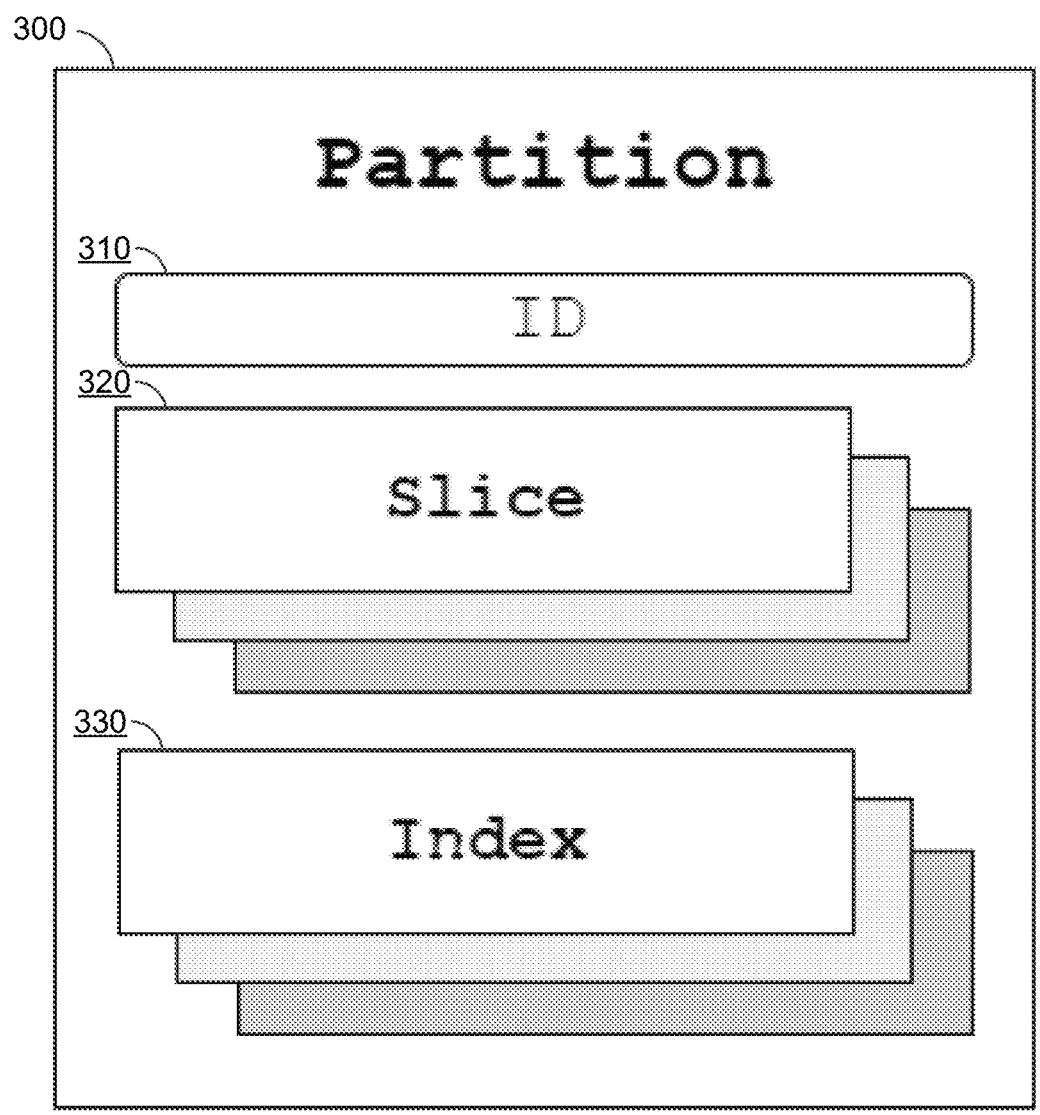
FIG. 3 is a functional block diagram of a partition of documents, which forms a portion of the collection of FIG. 2, in accordance with some embodiments.

FIG. 3 is a functional block diagram of a partition 300 of documents, which forms a portion of the collection 200 of FIG. 2, in accordance with some embodiments. The illustrated partition 300 can be one of the plurality of partitions 220 in the collection 200. As illustrated, the partition 300 can include an identifier 310 which identifies the partition 300, a plurality of slices 320, and/or a plurality of indices 330. In some embodiments, a slice from the plurality of slices 320 can include a fixed maximum memory size, such as 32 MB of documents, for example. The plurality of indices 330 can provide information related to the documents contained within the partition 300, and specifically may provide information regarding the location of each document among the plurality of slices 320 of the partition 300.

Figure 4:
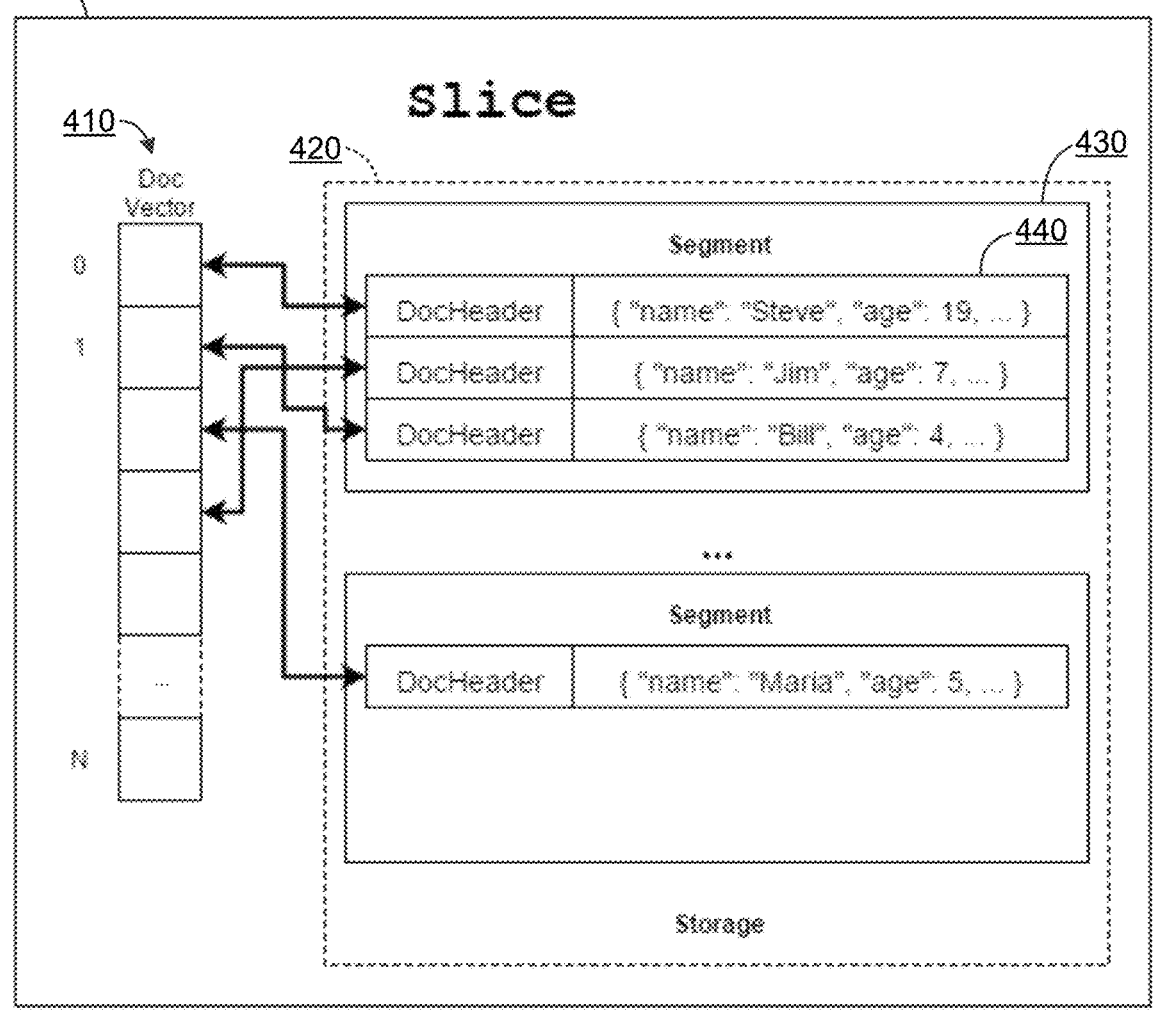
FIG. 4 is a functional block diagram of a slice of documents, which forms a portion of the partition of documents of FIG. 3, in accordance with some embodiments.

FIG. 4 is a functional block diagram of a slice 400 of documents, which forms a portion of the partition 300 of data/documents of FIG. 3, in accordance with some embodiments. The illustrated slice 400 can be one of the plurality of slices 320 in the partition 300. As illustrated, the slice 400 can include a document vector 410 and/or a storage 420 portion. The storage portion 420 can include one or more segments 430 of documents 440. In some aspects, the document vector 410 can include information regarding the location of the documents 440 within the segments 430 of the slice 400 of documents. In some aspects, the document vector 410 can include a pointer to the corresponding document 440 header, which can be used to access, process, and/or retrieve the document 440.

In some aspects, a document header can contain metadata about the actual document 440. For example, the document header can include a pointer to an older version, a pointer to a newer version, a creation timestamp, a tombstone flag (e.g., when pointer(s) to older version(s) have been deleted), and/or the like.

Figure 5:
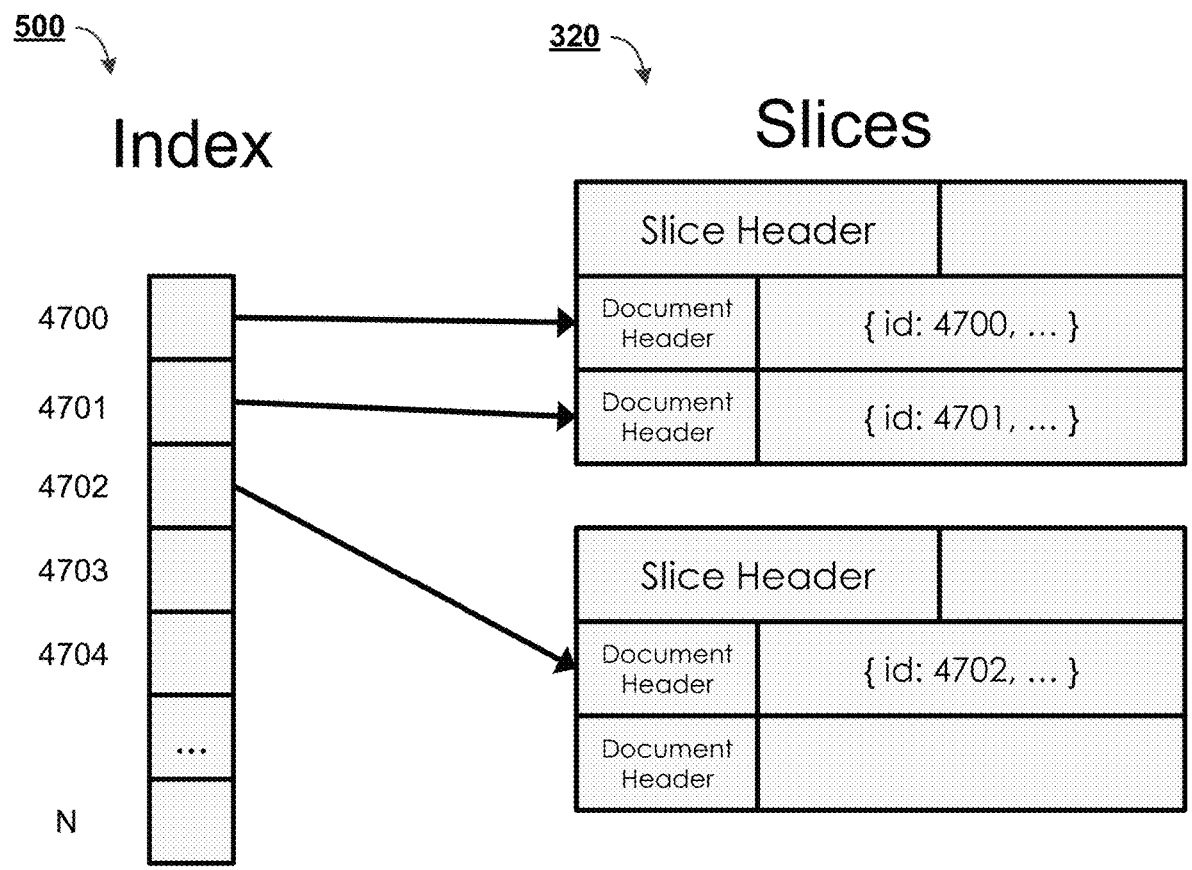
FIG. 5 is a functional block diagram of indices corresponding to a portion of the plurality of slices of documents, in accordance with some embodiments.

FIG. 5 is a functional block diagram of indices 500 corresponding to a portion of the plurality of slices 320, in accordance with some embodiments. In some aspects, the indices 500 can correspond to the document vector 410. However, in other aspects, the indices 500 can be external to the slices 320, and can include pointers to documents stored in multiple slices 320, and/or may be based on an identifier (e.g., "id: 4700") of at least a portion of the documents 122 stored in the document store 120. Thus indices can be used on a per-partition and/or a per-slice basis. In some aspects, the indices 500 can be updated based on insertion, updating, and/or deletion of documents from the document store 120 (e.g., from the slices 320). Thus, the indices 500 can be kept up to date.

Figure 6:
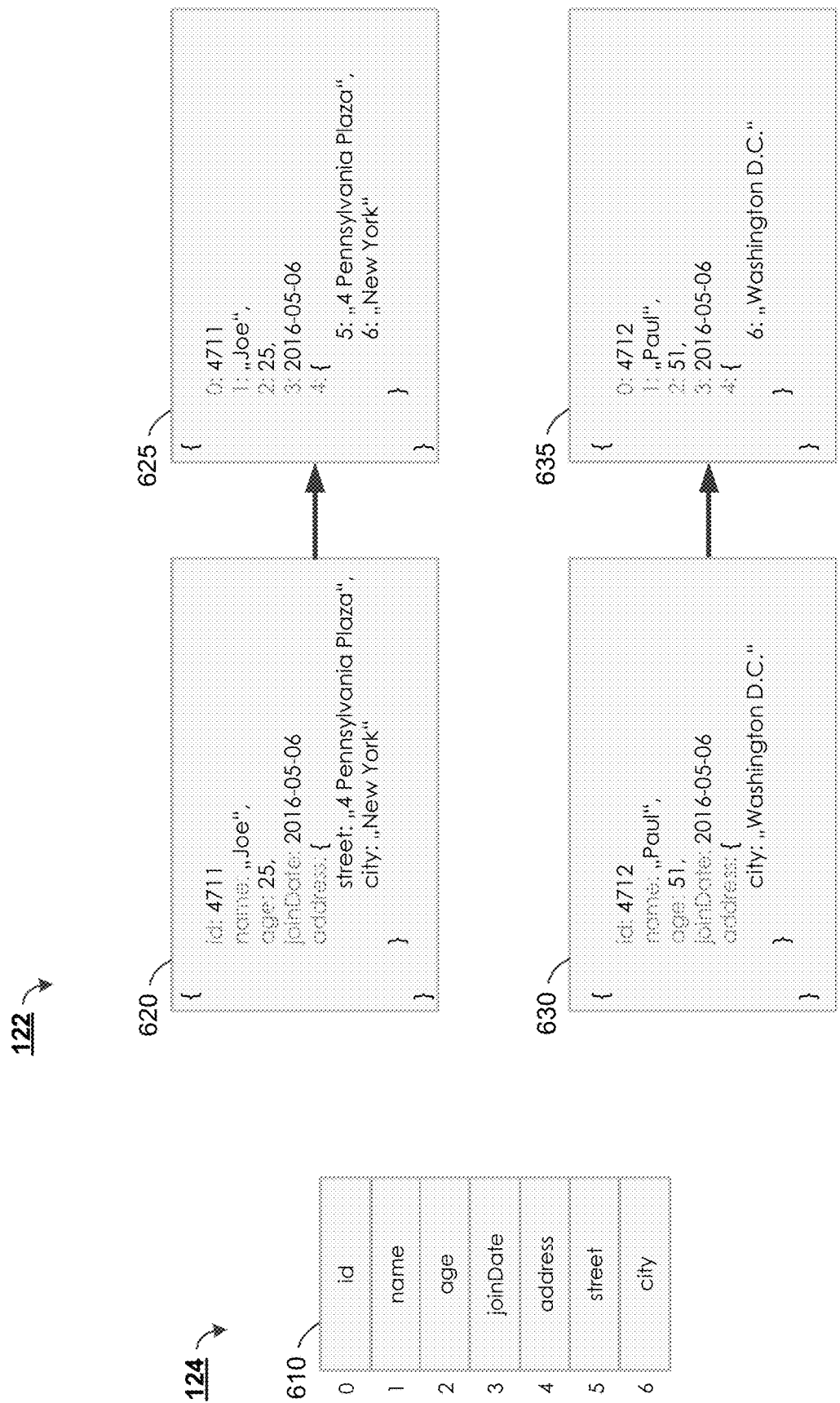
FIG. 6 is a functional block diagram of a portion of documents and the dictionary of the document store, in accordance with some embodiments.

FIG. 6 is a functional block diagram of one or more documents 122 and the dictionary 124 of the document store 120, in accordance with some embodiments. In the illustrated example, the dictionary 124 can include dictionary 610, and the documents 122 can contain documents 620, 625, 630, and/or 635. In some embodiments, the documents 620, 625, 630, and/or 635 can be JSON or PJSON documents. As illustrated, documents 620 and 630 can have some fields which are common to each other. Specifically, each of the documents 620 and 630 may have an id field, a name field, an age field, a joinDate field, an address field, and/or a city field. For each of the fields in the documents 620 and 630, a corresponding entry in the dictionary 610 can be added, where each entry contains a value and a corresponding text for the field. For example, as illustrated, the dictionary 610 includes entries "0: id", "1: name", "2: age", "3: joinDate", "4: address", "5: street", and "6: city". The dictionary 610 and documents 620-635 are simply for illustration, as dictionaries with any number of entries and/or documents with different contents may be used in other embodiments.

Using the entries of the dictionary 610, document 620 can be converted (e.g., encoded/compressed) into document 625. Similarly, document 630 can be converted (e.g., encoded/compressed) into document 635. Documents 625 and 635, along with the dictionary 610, might be stored in the document store 120 instead of documents 620 and 630. Doing so can save space in memory, as less characters are required to store the encoded documents 625 and 635 with the dictionary 610, compared to the characters required to store the decoded documents 620 and 630. As the number of documents 122 stored in the document store 120 increases, the potential for saving space will increase.

As noted above, documents 122 in the document store 120 can be retrieved, stored, created, and/or the like based on queries (e.g., SQL queries or the like). However, as the documents 122 might be stored in an unstructured/partially structured manner, locating relevant documents and/or contents within the document store 120 can be challenging. As such, methods for storage of documents and/or handling of queries are described. For example, FIG. 7 is a functional block diagram of a portion of the slices 320 of documents and the dictionary 124, in accordance with some embodiments. As illustrated, the plurality of slices 320 can include slices 710 and 720, and the dictionary can include dictionary 730.

Based upon processing the slices 710 and 720, it may be determined that the range of id values for the slice 710 is "min: 4000" and "max: 8000", and that the range of id values for the slice 720 is "min: 7000" and "max: 10000". Similarly, it may be determined that the range of joinDate values for the slice 710 is "min: 2014-01-05" and "max: 2015-04-05", and that the range of joinDate values for the slice 720 is "min: 2015-04-04" and "max: 2016-05-06". The determined ranges of values may be stored within the dictionary 610. For example, the determined ranges can be stored alongside the corresponding field. In this regard, the dictionary 730 can form a table, which can be searched based on a field identifier (e.g., 0, 1, 2, etc.), a field description (e.g., name, age, etc.), slice identifier (e.g., slice 1, slice 2, etc.), field value (e.g., "id=5000"), field value range (e.g., "id>5000 AND id<6000"), and/or the like.

In some aspects, the ranges of documents can be rounded up or down, based on the identified values. For example, the lowest id value for a document present within the slice 710 might be "4711", but the minimum value stored in the dictionary 730 for the slice 710 might be rounded down to "4000". The stored maximum can be similarly rounded up. Although this may cause some overlap among slices 320, making the ranges over-inclusive may avoid overlooking slices 320 which actually contain relevant data (e.g., when one or more of the slices 320 are updated but the range stored in the dictionary 730 does not capture all of the updated values).

When a query is received for one or more documents stored at the document store 120, the computing apparatus 102 can search the dictionary 124 to quickly identify location(s) of documents matching the query parameters. Providing the ranges in a table organized in this manner can decrease processing time/resources required to respond to a query for documents. When executing a query and searching for relevant slices 320 in this manner, ignoring slices 320 can be referred to as pruning of the slices 320. In some aspects, pruning can occur as a pre-processing procedure. For example, based on a query, the computing apparatus 102 can first decide which slices 320 to prune. After pruning these slices 320, the computing apparatus 102 can further utilize the remaining slices 320 to actually execute the query. Pre-processing in this manner can save additional processing time/resources.

Figure 8:
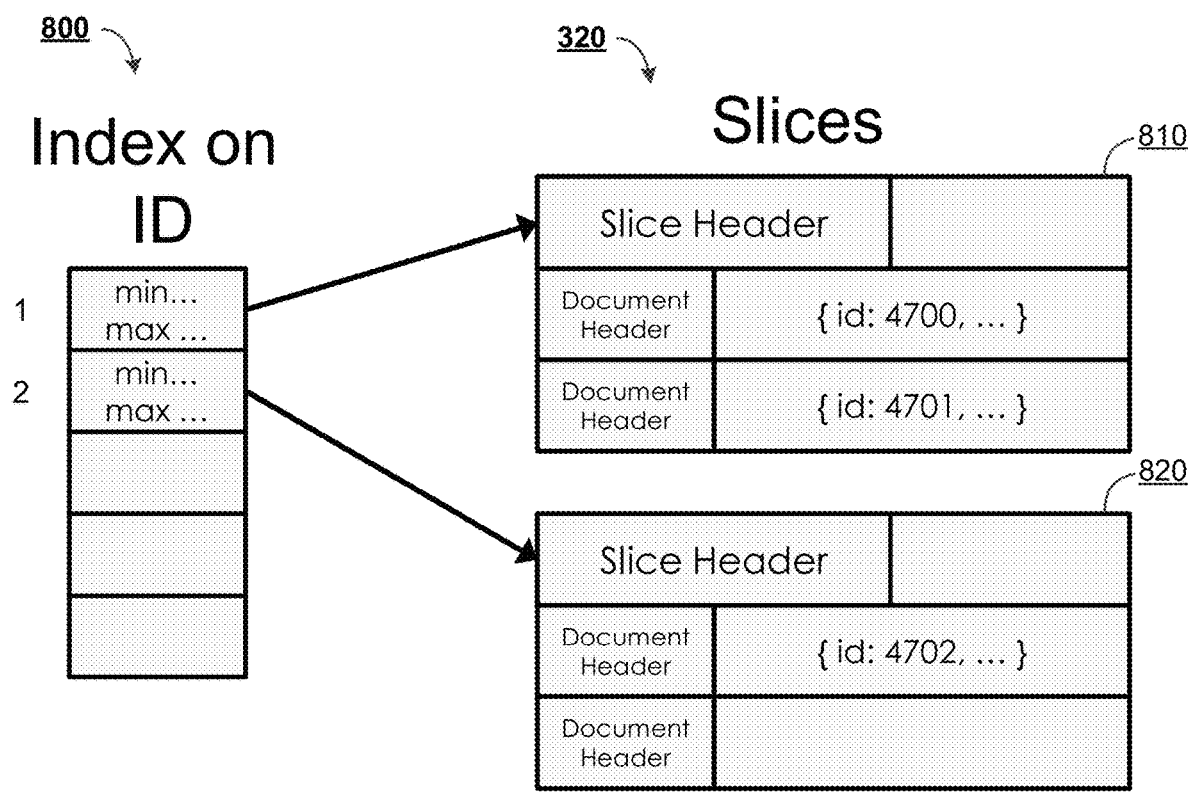
FIG. 8 is another functional block diagram of indices corresponding to a portion of the slices of documents, in accordance with some embodiments.

FIG. 8 is another functional block diagram of indices 800 corresponding to a portion of the slices 320 of documents, in accordance with some embodiments. In some aspects, the indices 800 can correspond to the indices 500 of FIG. 5. However, in other aspects, the indices 800 can be modified to include/refer to ranges, and/or to point to slice headers instead of document headers. In some aspects, a slice header can include metadata for the corresponding slice 320. For example, similar to above, the computing system 102 can determine that the range of id values for the slice 810 is "min: 4700" and "max: 4701", and that the range of id values for the slice 820 is "min: 4702" and "max: 4702". These ranges can be stored in/along with the indices 800, and may be referenced during processing of queries (e.g., for pruning and/or execution of the query). Although "id" ranges are illustrated and described, other fields and/or field values are possible. Other modifications to this procedure may be made, as described herein (e.g., rounding minimums and maximums).

In some aspects, the indices 800 (e.g., the corresponding ranges and/or pointers) can be updated based on insertion, updating, and/or deletion of documents from the document store 120 (e.g., from the slices 320). Similarly, the indices 800 can be updated based on insertion, updating, and/or deletion of slices 320. Thus, the indices 800 can be kept up to date.

Figure 9:
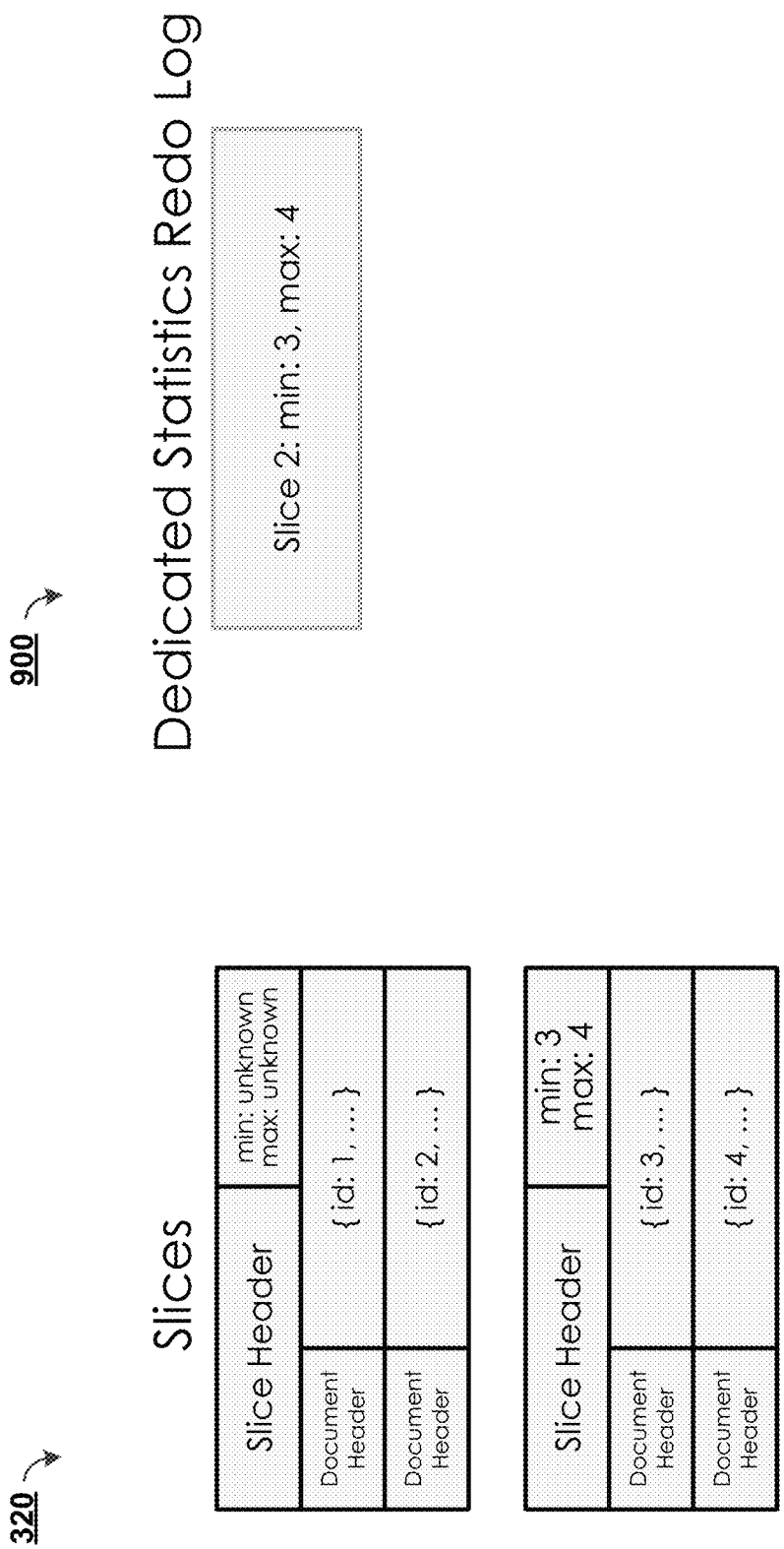
FIG. 9 is a functional block diagram of a portion of the slices of documents and a statistics log, in accordance with some embodiments.

FIG. 9 is a functional block diagram of a portion of the slices 320 of documents and a statistics log 900, in accordance with some embodiments. Similar to above, the slices 320 and/or documents within the slices can be analyzed, and statistics (e.g., minimums, maximums, etc.) about the documents and/or slices 320 can be stored within the dedicated statistics log 900. In some embodiments, the statistics log 900 can be created via an asynchronous process that considers full slices (e.g., without pending updates or the like). The statistics log 900 may be referenced during processing of queries (e.g., for pruning and/or execution of the query). Other modifications to this procedure may be made, as described herein (e.g., rounding minimums and maximums).

In some aspects, statistics can be written as a transaction into the statistics log 900. Use of the dedicated statistics log 900 can require less frequent or less complicated updates. In some aspects, the statistics log 900 can be stored separate from the slices 320 and/or the document store 120, and may be accessed independently through a separate stream. Doing so can free up resources for processing on the document store 120. Having a separate stream can allow the stream to be opened up independently from the stream for slices. The statistics can be comparably small in volume to the slices. Accordingly, in some embodiments, the statistics can be opened first, and thereafter, only slices determined to be relevant (or potentially relevant) are loaded into memory.

Figure 10:
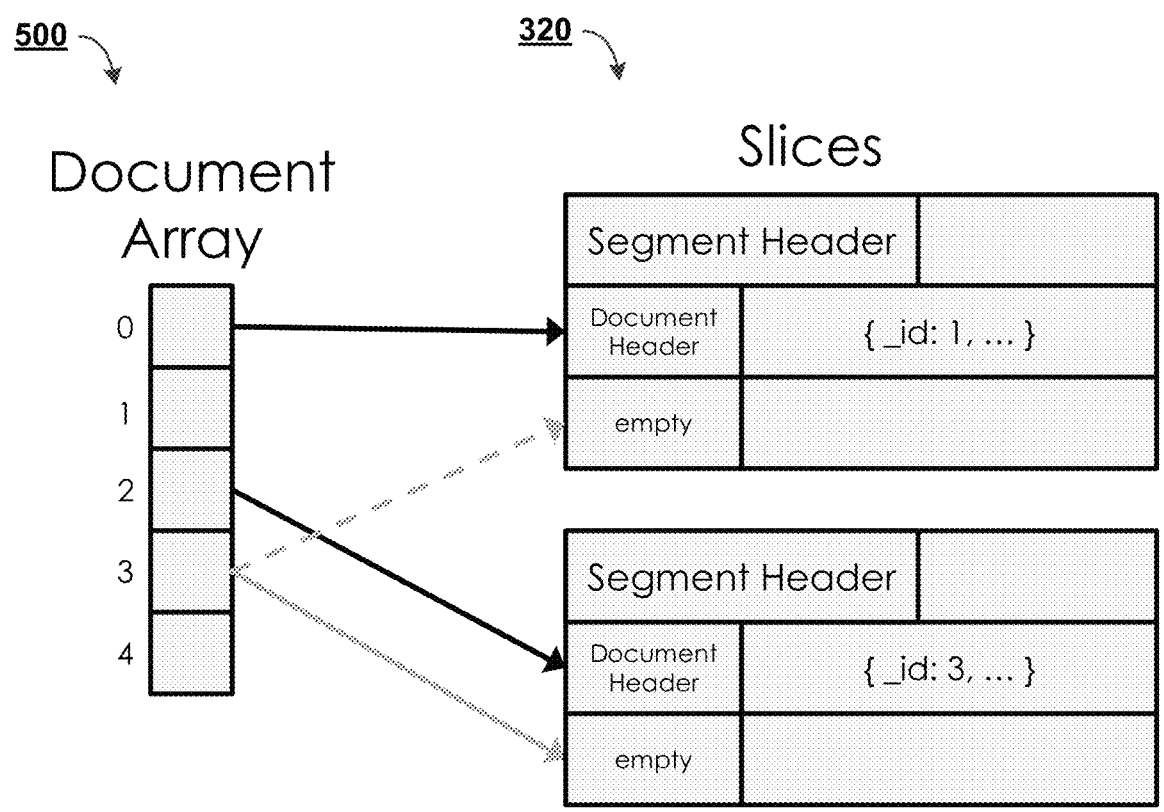
FIG. 10 is a functional block diagram of the document vector and a portion of the slices of documents, in accordance with some embodiments.

FIG. 10 is a functional block diagram of the indices 500 corresponding to a portion of the plurality of slices 320 of documents, in accordance with some embodiments. In some aspects, new documents might only be appended to the end of the slices 320, even when there is an available location somewhere earlier in the slices 320. Doing so can be beneficial where the id of the documents increases sequentially and/or creation dates of the documents are maintained. In order to decrease the space used to store documents, the slices 320 can be periodically merged in order to reduce the number of empty spaces. Merging can similarly occur upon the occurrence of an event, such as when one or more adjacent slices 320 have a threshold number of documents or empty spaces for documents.

Figure 11:
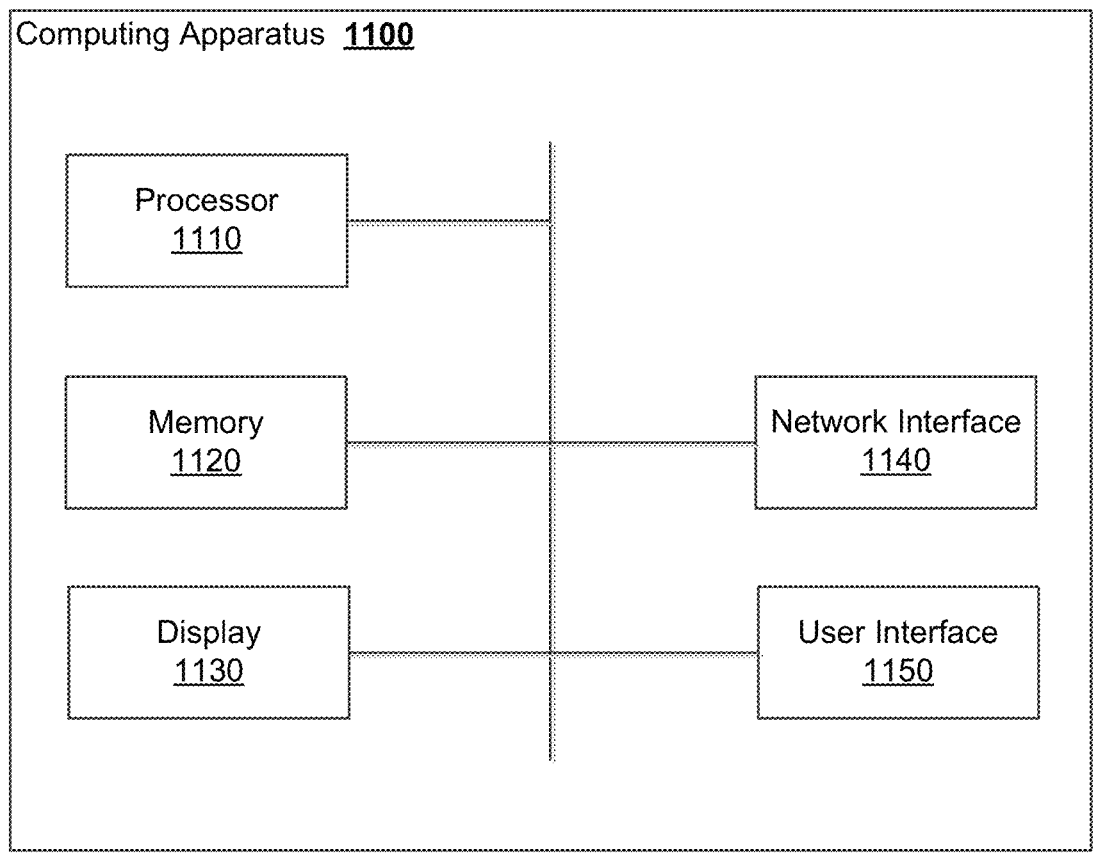
FIG. 11 is an illustration of a computing apparatus for processing documents for the document store, in accordance with some embodiments.

FIG. 11 is an illustration of a computing apparatus 1100 for processing documents for the document store, in accordance with some embodiments. An apparatus consistent with FIG. 11 may implement a user device 108, the computing system 102, the database management agent 112, and/or other related apparatuses. Computing apparatus 1100 may perform at least a portion of the processes described herein.

Computing apparatus 1100 may include one or more processors such as processor 1110 to execute instructions that may implement operations consistent with those described herein. Apparatus 1100 may include memory 1120 to store executable instructions and/or information. Memory 1120 may include solid-state memory, solid-state disk drives, magnetic disk drives, or any other information storage device. Memory 1120 may provide storage for at least a portion of a database. Apparatus 1100 may include a network interface 1140 to a wired network or a wireless network, such as the network 110 of FIG. 1. Wireless networks may include WiFi, WiMax, and cellular networks (2G/3G/4G/5G), and/or any other wireless network. Apparatus 1100 may include one or more user interface, such as user interface 1150. The user interface 1150 can include hardware or software interfaces, such as a keyboard, mouse, or other interface that may include a touchscreen integrated with a display 1130.

FIG. 12 is a flowchart of a method 1200 for pruning slices of documents in a document store, in accordance with some embodiments. In various embodiments, the method 1200 (or at least a portion thereof) may be performed by one or more of a database server, the apparatus 1100, a user device 108, the computing system 102, the database management agent 112, and/or other related apparatuses. In some aspects, the apparatus 1100 may be regarded as a server.

Method 1200 can begin at operational block 1210 where the apparatus 1100, for example, analyzes a plurality of parameters of a plurality of stored documents stored among a plurality of slices in a database. In some embodiments, the plurality of slices comprises an organization of documents and/or the plurality of slices are part of one or more database partitions. In some aspects, the plurality of stored documents can be stored in a document storage collection (e.g., within a database). In some embodiments, the plurality of stored documents are binary representations of JavaScript Object Notation (JSON) documents (e.g., PJSON documents).

Method 1200 can proceed to operational block 1220 where the apparatus 1100, for example, generates statistics about the plurality of parameters, where the statistics comprise a range of document identifiers present in corresponding slices from the plurality of slices. In various aspects, the generation of the statistics can be based on the analyzing. In some embodiments, the plurality of parameters comprises document creation dates, and/or the statistics further comprise a range of the document creation dates present in the corresponding slices. In various embodiments, analyzing the plurality of parameters includes determining a maximum value and a minimum value for each (or at least a portion) of the plurality of parameters. In related embodiments, generating the statistics includes calculating ranges of values based on the corresponding maximum value and minimum value for each (or at least a portion) of the plurality of parameters.

Method 1200 can proceed to operational block 1230 where the apparatus 1100, for example, stores the statistics. In some embodiments, the plurality of stored documents are encoded based on a dictionary which includes a plurality of definitions corresponding to the plurality of parameters. The plurality of definitions can include a reference value and a corresponding parameter from the plurality of parameters, and/or the plurality of stored documents can be encoded to include, in place of at least a portion of the plurality of parameters, a plurality of reference values defined in the dictionary. In some related embodiments, storing the statistics can include storing the statistics along with corresponding definitions of parameters related to the statistics. In related embodiments, pruning the one or more slices can include considering only slices from the plurality of slices which include statistics responsive to the query (e.g., removing certain slices from consideration).

In some embodiments, storing the statistics can include storing the statistics along with a list of indices for the plurality of slices. Each index in the list of indices can include a pointer to a corresponding slice. In related embodiments, pruning the one or more slices can include considering only slices from the plurality of slices which include statistics responsive to the query. In certain embodiments, storing the statistics can include storing the statistics as entries in a statistics log of the database (which can be independent of a data log, volume, and/or stream of the database), wherein pruning the one or more slices includes considering only slices from the plurality of slices which include statistics responsive to the query. In some implementations, the statistics log can be generated based on processing full slices from the plurality of slices, where the processing occurs asynchronously from processing the query.

Method 1200 can proceed to operational block 1240 where the apparatus 1100, for example, receives a query related to at least a portion of the plurality of stored documents. For example, the query can request some of the stored documents and/or information related to the stored documents (e.g., a query which requests an intersection of two or more documents).

Method 1200 can proceed to operational block 1250 where the apparatus 1100, for example, prunes one or more slices of the plurality of slices based on and/or in response to the query. In some aspects, the pruning can be based on the statistics. As described herein, pruning can include removing one or more documents/slices/partitions from consideration (e.g., consideration for a response to the query). For example, as illustrated, method 1200 can proceed to operational block 1260 where the apparatus 1100 can generate a response based on the remaining plurality of slices. Thereafter, method 1200 can proceed to operational block 1270 where the apparatus 1100 can provide the response to a user device which initiated the query (e.g., via a network or other connection).

As a non-limiting example of a benefit of the various implementations described, processing time/requirements and/or storage requirements on the part of the computing system 102 and/or the user device 108 can be reduced.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
at least one data processor; and
at least one memory storing instructions which, when executed by the at least one data processor, cause operations comprising:
analyzing, at a database server, a plurality of documents, wherein the plurality of documents includes documents that are at least partially unstructured, wherein each document of the plurality of documents includes a content identifier in an unstructured portion of the document, wherein a first portion of the plurality of documents are stored in a first slice, wherein a second portion of the plurality of documents are stored in a second slice, and wherein the first slice and the second slice are among a plurality of slices stored in a persistence layer of a document store;
generating, by the database server and based on the analyzing, a first identifier range and a second identifier range, wherein the first identifier range comprises a first range of content identifier values included in the first portion of the plurality of documents stored in the first slice, and wherein the second identifier range comprises a second range of content identifier values included in the second portion of the plurality of documents stored in the second slice;
generating, by the database server and based on the first identifier range, a first slice index, wherein the first slice index includes the first identifier range and a pointer to the first slice;
generating, by the database server and based on the second identifier range, a second slice index, wherein the second slice index includes the second identifier range and a pointer to the second slice;
receiving, at the database server and from a user device, a database query;

determining, by the database server and in response to the database query being received, a range of query values;

determining, by the database server, that the first identifier range included in the first slice index is outside of the range of the query values;

determining, by the database server, that the second identifier range included in the second slice index is within the range of the query values;

pruning, by the database server, the first slice in response to determining that the first identifier range included in the first slice index is outside of the range of query values; and executing, by the database server, the database query, wherein the first slice is excluded from the query execution in response to the first slice being pruned, and wherein the second slice is included in the query execution in response to the determining that the second identifier range is within the range of the query values.

2. The system of claim 1, wherein the plurality of documents are encoded based on a dictionary, wherein the dictionary includes a definition corresponding to a content identifier value, wherein the definition includes a reference value and the content identifier value, and wherein the plurality of documents are encoded to include, in place of at least a portion of the content identifier value, the reference value.

3. The system of claim 2, wherein the operations further comprise:
storing, in the dictionary, the definition along with the first identifier range and the second identifier range.

4. The system of claim 1, wherein the operations further comprise:
storing, by the database server, the first identifier range as an entry in a statistics log of the database, wherein the statistics log is independent of a data log of the database.

5. The system of claim 4, wherein the operations further comprise:
generating, by the database server, the statistics log based on processing the first portion of the plurality of documents stored in the first slice, wherein the processing occurs asynchronously from processing the database query.

6. The system of claim 1, wherein the plurality of slices comprise an organization of documents, and wherein the plurality of slices are part of one or more database partitions.

7. The system of claim 1, wherein the content identifier comprises a document creation date, and wherein the first identifier range further comprises a range of the document creation dates present in the first slice.

8. The system of claim 1, wherein analyzing the plurality of documents further includes determining, for the first portion of the plurality of documents, a content identifier maximum value and a content identifier minimum value, and wherein generating the first identifier range for the first slice includes calculating, for the first slice, the content identifier maximum value and the content identifier minimum value.

9. The system of claim 1, wherein the plurality of documents are stored in a document storage collection.

10. The system of claim 1, wherein the plurality of documents comprise binary representations of JavaScript Object Notation documents.

11. The system of claim 1, wherein the first slice index corresponds to one or more document vectors, and wherein the first slice index and/or the one or more document vectors indicate one or more slice headers and/or one or more document headers.

12. A method comprising:
analyzing, by a processor at a database server, a plurality of documents, wherein the plurality of documents includes documents that are at least partially unstructured, wherein each document of the plurality of documents includes a content identifier in an unstructured portion of the document, wherein a first portion of the plurality of documents are stored in a first slice, wherein a second portion of the plurality of documents are stored in a second slice, and wherein the first slice and the second slice are among a plurality of slices stored in a persistence layer of a document store;

generating, by the processor and based on the analyzing, a first identifier range and a second identifier range, wherein the first identifier range comprises a first range of content identifier values included in the first portion of the plurality of documents stored in the first slice, and wherein the second identifier range comprises a second range of content identifier values included in the second portion of the plurality of documents stored in the second slice;

generating, by the processor and based on the first identifier range, a first slice index, wherein the first slice index includes the first identifier range and a pointer to the first slice;

generating, by the processor and based on the second identifier range, a second slice index, wherein the second slice index includes the second identifier range and a pointer to the second slice;

receiving, at the processor and from a user device, a database query;

determining, by the processor and in response to the database query being received, a range of query values;

determining, by the processor, that the first identifier range included in the first slice index is outside of the range of the query values;

determining, by the processor, that the second identifier range included in the second slice index is within the range of the query values;

pruning, by the processor, the first slice in response to determining that the first identifier range included in the first slice index is outside of the range of query values; and executing, by the processor, the database query, wherein the first slice is excluded from the query execution in response to the first slice being pruned, and wherein the second slice is included in the query execution in response to the determining that the second identifier range is within the range of the query values.

13. The method of claim 12, further comprising:
storing, by the processor, in a dictionary including a definition corresponding to a content identifier value, the first identifier range and the second identifier range, wherein the plurality of documents are encoded based on the dictionary.

14. The method of claim 12, further comprising:
storing, by the processor, the first identifier range as an entry in a statistics log of the database, wherein the statistics log is independent of a data log of the database.

15. A non-transitory computer-readable storage medium including program code which, when executed by at least one processor, causes operations comprising:

analyzing, at a database server, a plurality of documents, wherein the plurality of documents includes documents that are at least partially unstructured, wherein each document of the plurality of documents includes a content identifier in an unstructured portion of the document, wherein a first portion of the plurality of documents are stored in a first slice, wherein a second portion of the plurality of documents are stored in a second slice, and wherein the first slice and the second slice are stored in a persistence layer of a document store;

generating, by the database server and based on the analyzing, a first identifier range and a second identifier range, wherein the first identifier range comprises a first range of content identifier values included in the first portion of the plurality of documents stored in the first slice, and wherein the second identifier range comprises a second range of content identifier values included in the second portion of the plurality of documents stored in the second slice;

generating, by the database server and based on the first identifier range, a first slice index, wherein the first slice index includes the first identifier range and a pointer to the first slice;

generating, by the database server and based on the second identifier range, a second slice index, wherein the second slice index includes the second identifier range and a pointer to the second slice;

receiving, at the database server and from a user device, a database query;

determining, by the database server and in response to the database query being received, a range of query values;

determining, by the database server, that the first identifier range included in the first slice index is outside of the range of the query values;

determining, by the database server, that the second identifier range included in the second slice index is within the range of the query values;

pruning, by the database server, the first slice in response to determining that the first identifier range included in the first slice index is outside of the range of query values; and executing, by the database server, the database query, wherein the first slice is excluded from the query execution in response to the first slice being pruned, and wherein the second slice is included in the query execution in response to the determining that the second identifier range is within the range of the query values.

16. The non-transitory computer-readable storage medium of claim 15, wherein the operations further comprise:

storing, in a dictionary including a definition corresponding to a content identifier value, the first identifier range and the second identifier range, wherein the plurality of documents are encoded based on the dictionary.

17. The non-transitory computer-readable storage medium of claim 15, wherein the operations further comprise:

storing, by the database server, the first identifier range as an entry in a statistics log of the database, wherein the statistics log is independent of a data log of the database.

* * * * *